United States Patent
Vandyke et al.

(10) Patent No.: US 11,325,712 B2
(45) Date of Patent: May 10, 2022

(54) SYSTEMS AND METHODS FOR LIMITING INFILTRATION OF CABIN AIR INTO THE FLIGHT DECK OF AN AIRCRAFT

(71) Applicant: The Boeing Company, Chicago, IL (US)

(72) Inventors: Bryce Avery Vandyke, Snohomish, WA (US); Marcus Karel Richardson, Everett, WA (US); Brian Tatsuo Imada, Fruitland, ID (US); Myles Brown, Bothell, WA (US); Steven Michael Loukusa, Bothell, WA (US)

(73) Assignee: The Boeing Company, Chicago, IL (US)

( * ) Notice: Subject to any disclaimer, the term of this patent is extended or adjusted under 35 U.S.C. 154(b) by 600 days.

(21) Appl. No.: 16/181,197

(22) Filed: Nov. 5, 2018

(65) Prior Publication Data

US 2020/0140093 A1  May 7, 2020

(51) Int. Cl.
  *B64D 13/04* (2006.01)
  *F24F 9/00* (2006.01)

(52) U.S. Cl.
  CPC ............. *B64D 13/04* (2013.01); *F24F 9/00* (2013.01); *F24F 2009/005* (2013.01); *F24F 2009/007* (2013.01)

(58) Field of Classification Search
  USPC ............................. 454/190, 192; 244/129.5
  See application file for complete search history.

(56) References Cited

U.S. PATENT DOCUMENTS

| | | | | |
|---|---|---|---|---|
| 2,983,211 A | * | 5/1961 | Andresen, Jr. .......... | B64D 13/04 454/71 |
| 3,664,253 A | * | 5/1972 | Asker ....................... | F24F 9/00 454/188 |
| 3,715,968 A | * | 2/1973 | Henson ..................... | F24F 9/00 454/188 |
| 4,074,620 A | * | 2/1978 | Jansson .................... | F24F 9/00 432/64 |
| 4,121,790 A | * | 10/1978 | Graham ................. | B64D 25/00 169/48 |
| 4,631,876 A | * | 12/1986 | Saum ...................... | G01M 3/26 454/254 |

(Continued)

FOREIGN PATENT DOCUMENTS

DE  2359218 A1 * 6/1975 ............... F24F 9/00

*Primary Examiner* — Avinash A Savani
*Assistant Examiner* — Frances F. Hamilton
(74) *Attorney, Agent, or Firm* — Kolisch Hartwell, P.C.

(57) ABSTRACT

Systems and methods for limiting infiltration of cabin air into the flight deck of an aircraft, where the systems include at least one upper nozzle disposed adjacent to and above an outer upper edge of a flight deck doorway and directed downwardly, and at least one lower nozzle disposed adjacent to and below an outer lower edge of the flight deck doorway and directed upwardly; a conduit system to deliver air from a flight deck air supply to the upper and lower nozzles; and an airflow controller configured to provide sufficient air flow from the flight deck air supply to the upper and lower nozzles to create directional airstreams across the gaps between the closed flight deck door and the upper and lower edges of the flight deck doorway, so that the airstreams limit infiltration of cabin air into the flight deck via the gaps.

24 Claims, 4 Drawing Sheets

(56) References Cited

U.S. PATENT DOCUMENTS

| | | | | |
|---|---|---|---|---|
| 5,205,783 A * | 4/1993 | Dieckert | | B08B 15/023 |
| | | | | 454/238 |
| 5,312,297 A * | 5/1994 | Dieckert | | F24F 7/08 |
| | | | | 454/238 |
| 5,720,658 A * | 2/1998 | Belusa | | F24F 11/70 |
| | | | | 454/238 |
| 6,189,831 B1 * | 2/2001 | Asai | | B64D 11/0023 |
| | | | | 244/118.5 |
| 6,565,035 B1 * | 5/2003 | Kim | | B64D 13/00 |
| | | | | 244/1 R |
| 6,702,663 B2 * | 3/2004 | Israel | | F24F 9/00 |
| | | | | 454/188 |
| 7,118,474 B2 * | 10/2006 | Bjordal | | A61G 13/108 |
| | | | | 454/238 |
| 7,380,752 B2 * | 6/2008 | Guard | | B64C 1/066 |
| | | | | 244/118.5 |
| 7,568,659 B2 * | 8/2009 | Roques | | B64C 1/1423 |
| | | | | 244/121 |
| 7,839,275 B2 * | 11/2010 | Spalink | | G05D 23/1931 |
| | | | | 340/501 |
| 9,057,528 B2 * | 6/2015 | Browne | | B60J 10/242 |
| 9,388,996 B2 * | 7/2016 | Ray | | F24F 9/00 |
| 10,449,844 B2 * | 10/2019 | Le Bastard | | B60J 9/04 |
| 10,577,074 B2 * | 3/2020 | King | | B64C 1/1469 |
| 11,015,999 B2 * | 5/2021 | Cooper | | G01M 3/3236 |
| 2005/0116098 A1 * | 6/2005 | Martens | | B64D 45/0031 |
| | | | | 244/118.5 |
| 2006/0111816 A1 * | 5/2006 | Spalink | | F24F 11/62 |
| | | | | 700/276 |
| 2007/0051048 A1 * | 3/2007 | Krohn | | E05B 53/003 |
| | | | | 49/413 |
| 2009/0311951 A1 * | 12/2009 | Walkinshaw | | F24F 5/0085 |
| | | | | 451/261 |
| 2012/0199003 A1 * | 8/2012 | Melikov | | F24F 3/163 |
| | | | | 95/273 |
| 2013/0005236 A1 * | 1/2013 | Kim | | F24F 11/30 |
| | | | | 454/238 |
| 2013/0305670 A1 * | 11/2013 | Bordin | | F24F 13/18 |
| | | | | 55/385.2 |

\* cited by examiner

SYSTEMS AND METHODS FOR LIMITING INFILTRATION OF CABIN AIR INTO THE FLIGHT DECK OF AN AIRCRAFT

FIELD

This disclosure relates to air handling systems for aircraft, and more specifically, the disclosed embodiments relate to air handling systems and methods for limiting infiltration of cabin air into the flight deck of an aircraft using those air handling systems.

INTRODUCTION

Federal regulations require that commercial aircraft be equipped with some means to limit the infiltration of air from the passenger cabin into the flight deck (see 14 C.F.R. § 25.795(b)(1)).

Current design strategies for ensuring compliance with such regulations generally rely upon creating a positive pressure differential between the flight deck and the passenger cabin, and/or minimizing or eliminating potential pathways for air flow between the flight deck and the passenger cabin. While generally successful, there are nonetheless drawbacks to these approaches.

For example, flight deck positive pressure is made easier to maintain by creating an enhanced seal around the flight deck door. Unfortunately, such seals may conflict with egress efficiency, or with rapid decompression venting requirements. It may be similarly impractical to limit air movement between compartments as, for example, the flight deck floor may incorporate a variety of openings and pass-throughs to facilitate rapid decompression venting, wiring, flight controls, and air handling ducts.

Additionally, the design of the overall aircraft may complicate the maintenance of a positive pressure difference between the flight deck and passenger cabin, due to the location of aircraft pressurization outflow valve(s), the number and location of air conditioning air return vents, and simple leakage between compartments.

It may also be impractical to maintain a sufficiently high pressure within the flight deck due to unacceptable air movement (drafts), and/or excessive power demands on the electrical capacity of the aircraft.

SUMMARY

The present disclosure provides systems and methods for limiting infiltration of cabin air into the flight deck of an aircraft.

In some embodiments, the disclosure may provide systems for limiting infiltration of cabin air into a flight deck of an aircraft. The disclosed systems include at least one upper nozzle that is disposed adjacent to and above the outer upper edge of a flight deck doorway, and that is directed downwardly. The disclosed system further includes at least one lower nozzle disposed adjacent to and below the outer lower edge of the flight deck doorway, and that is directed upwardly. The disclosed system further includes a conduit system configured to deliver air from the flight deck air supply to the upper and lower nozzles, and an airflow controller that is configured to provide a sufficient air flow from the flight deck air supply to the upper and lower nozzles to create directional airstreams across the gaps existing between the closed flight deck door and the upper and lower edges of the flight deck doorway, limiting infiltration of cabin air into the flight deck.

In some embodiments, the disclosure may provide aircraft systems for limiting infiltration of cabin air into the flight deck. The disclosed systems include a cabin air pressure sensor, a flight deck air pressure sensor, and air delivery system, and a processor that is coupled to the cabin air pressure sensor and the flight deck air pressure sensor, and is configured to control the air delivery system. The air delivery system is configured to deliver air from the flight deck to create air curtains across the upper gap between the upper edge of the flight deck doorway and the flight deck door, and across the lower gap between the lower edge of the flight deck doorway and the flight deck door. The processor is configured to measure a cabin air pressure using the cabin air pressure sensor, measure a flight deck air pressure using the flight deck air pressure sensor, calculate a difference between the measured cabin air pressure and the measured flight deck air pressure, predict an inflow rate of cabin air into the flight deck based upon the calculated air pressure difference, and create a sufficient air flow from the air delivery system that the air curtains created thereby limit the infiltration of cabin air into the flight deck.

In some embodiments, the disclosure may provide methods of limiting infiltration of cabin air into a flight deck of an aircraft. The disclosed methods include measuring a cabin air pressure, measuring a flight deck air pressure, determining an air pressure difference between the measured cabin air pressure and the measured flight deck air pressure, and calculating a predicted inflow rate of cabin air into the flight deck via an upper flight deck door gap defined by an upper edge of a flight deck doorway and an upper edge of a flight deck door and a lower flight deck door gap defined by a lower edge of the flight deck doorway and a lower edge of the flight deck door, where the predicted inflow rate is based upon the determined air pressure difference. The disclosed method further includes creating an upper air jet and a lower air jet with air from the flight deck air supply, where the upper air jet is a downwardly directed airstream across the entire outside width of the upper door gap, and the lower air jet is an upwardly directed airstream across the entire outside width of the lower door gap, with the result that the upper air jet and lower air jet have a combined air flow that is twice the predicted inflow rate, and limits infiltration of cabin air into the flight deck.

The disclosed features, functions, and advantages of the disclosed systems and methods may be achieved independently in various embodiments of the present disclosure, or may be combined in yet other embodiments, further details of which can be seen with reference to the following description and drawings.

DESCRIPTION

Figure 1:
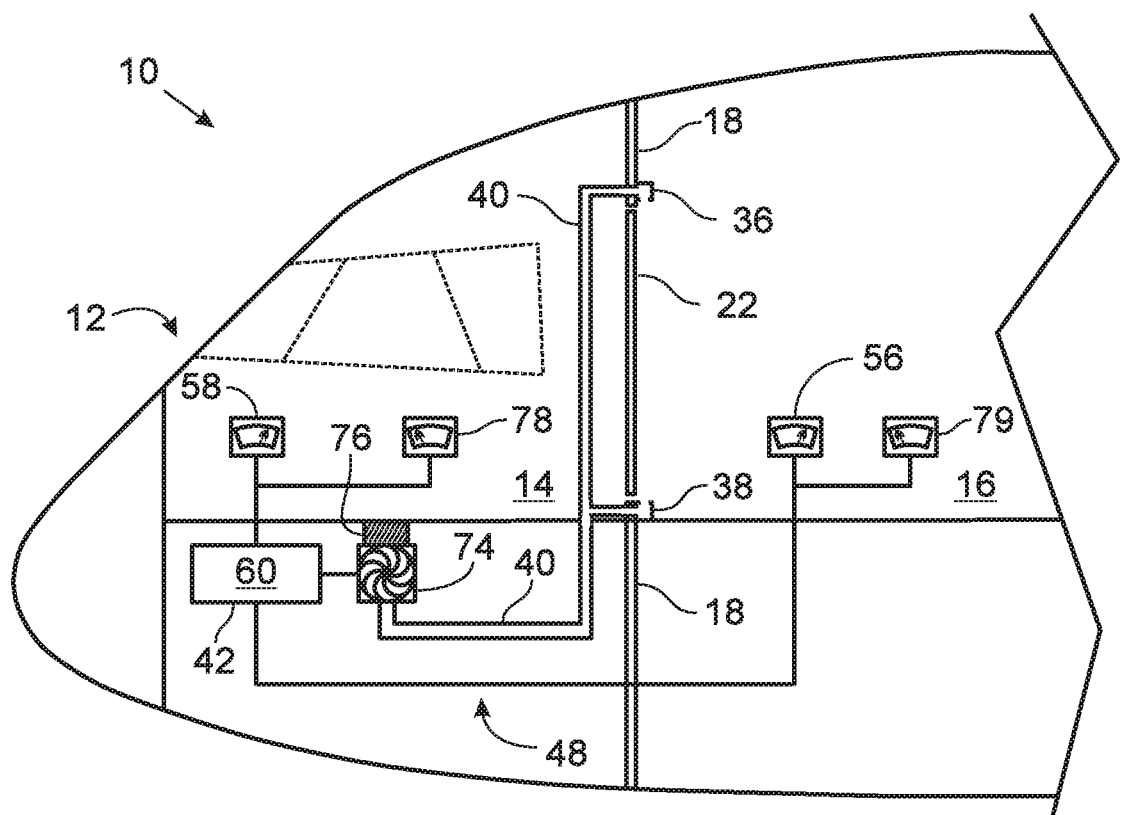
FIG. 1 semi-schematically depicts a portion of an aircraft that includes a system for limiting infiltration of cabin air into the flight deck according to the present disclosure.

FIG. 1 depicts a semi-schematic view of the nose portion of a representative aircraft 10 that includes a system 12 for limiting infiltration of cabin air into the flight deck of aircraft 10 according to the present disclosure. FIG. 1 includes a representation of the flight deck 14 and a passenger cabin 16, separated by a bulkhead 18. A flight deck doorway 20 is set into bulkhead 18 to permit access to flight deck 14.

Figure 2:
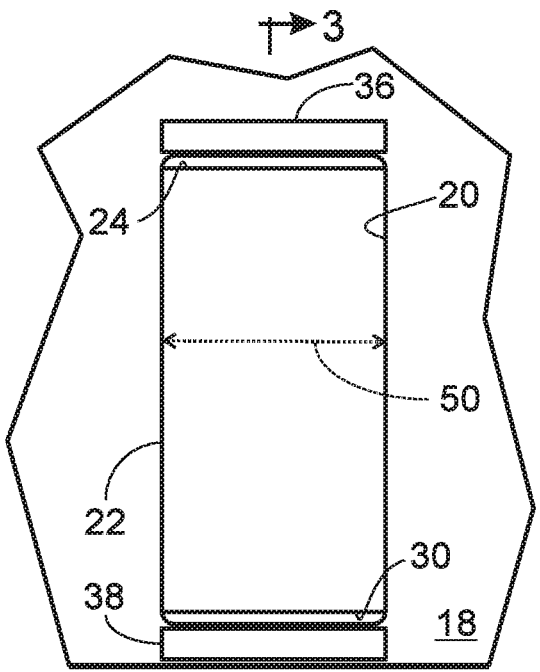
FIG. 2 depicts a flight deck door and doorway set into a bulkhead between a flight deck and passenger cabin of the aircraft of FIG. 1.
Figure 3:
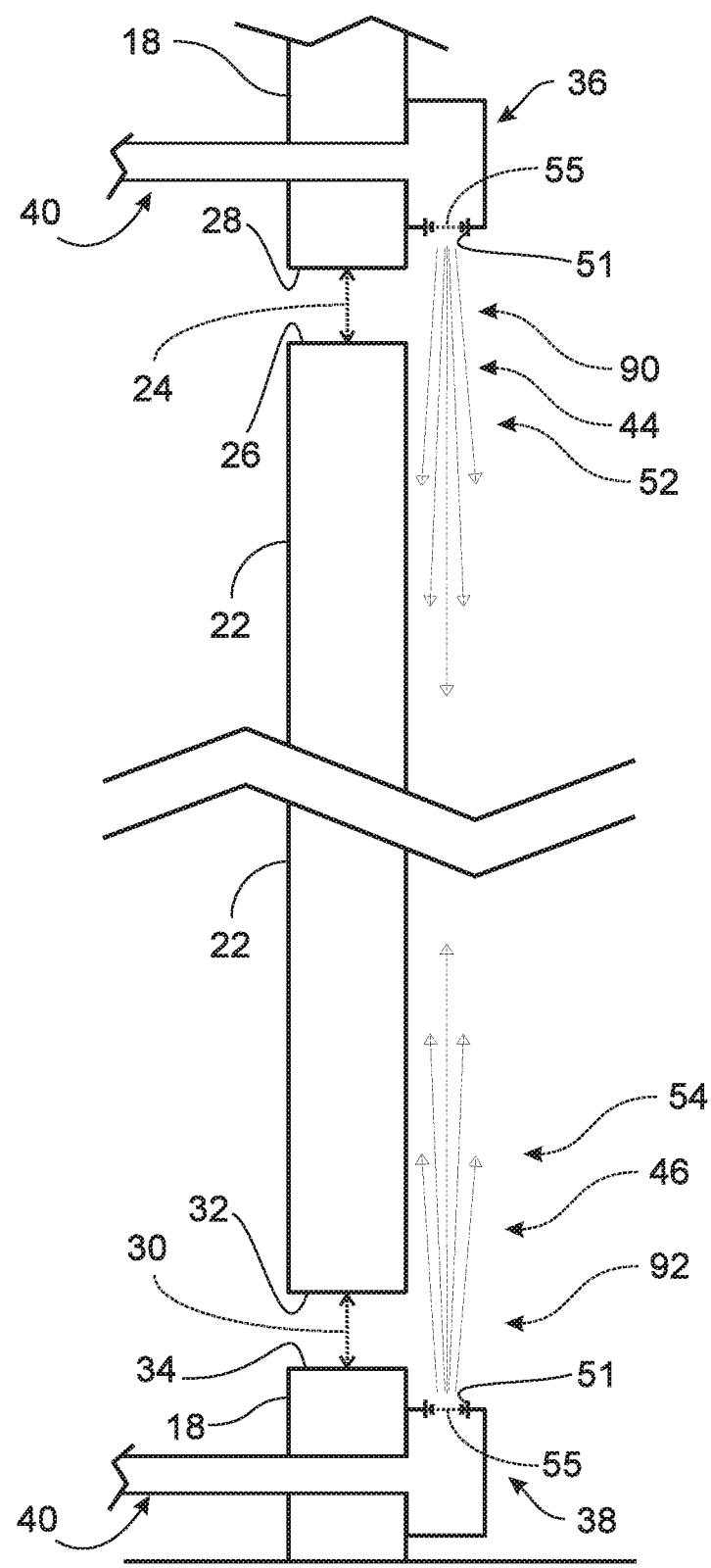
FIG. 3 is a semi-schematic side cross-sectional view of the flight deck door and doorway of FIG. 2

As shown in FIGS. 1, 2, and 3, flight deck doorway 20 is fitted with a flight deck door 22 that provides access to flight deck 14, and may provide security and control entry to flight deck 14, if needed. Flight deck door 22 typically does not form an air-tight seal with flight deck doorway 20, and in particular flight deck doorway 20 and flight deck door 22, in combination, define an upper gap 24 between the upper edge 26 of flight deck door 22 and upper edge 28 of flight deck doorway 20, and a lower gap 30 between the lower edge 32 of flight deck door 22 and lower edge 34 of flight deck doorway 20. The gaps 24 and 30 may provide a pathway for air to infiltrate flight deck 14 from passenger cabin 16, potentially carrying particulates or other contaminants from the passenger cabin 16.

Typically, the disclosed systems serve to create one or more air curtains across areas of potential leakage. By creating an air stream that blows either vertically or horizontally across the closed flight deck door, infiltration of air from the passenger cabin may be suppressed or eliminated. The presently disclosed methods and systems employ air streams directed across the outer surfaces of the upper and lower gaps to create air curtains across those gaps. The air flow or flows may entrain, dilute, and/or divert passenger cabin air away from points that might permit air leakage into the flight deck, and additionally supply clean air to these potential leak points. The source of air for the air flows may be from the local air distribution system or may be recirculated air, if it remains uncontaminated. In some aspects, one or more additional exhaust intakes may be disposed opposite the one or more air nozzles in order to help control the airflow pattern created across the doorway.

An air curtain is a directionally-controlled airstream, moving across some or all of the height and width of an opening, and thereby reduces the infiltration or transfer of air from one side of the opening to the other. An air curtain may be created by generating an air stream across the upper gap 24 and/or lower gap 30 between flight deck door 22 and flight deck doorway 20. Any air stream that generates an air curtain effect may be a useful air stream for the purposes of the present disclosure. Generally, a useful air steam is an air stream layer that moves with a velocity and an angle such that external air that tries to penetrate the curtain is substantially entrained. An air curtain may be considered successful at preventing infiltration when it prevents at least 60% of air infiltration through the opening shielded by the air curtain. In another preferably aspect of the disclosure, the air curtains of the present systems and methods prevent at least 80% of air infiltration through the openings shielded by the air curtains.

In order to create the desired air curtains, system 12 of aircraft 10 includes at least one upper nozzle 36 disposed adjacent to and above the outer upper edge 28 of flight deck doorway 20 and directed downwardly, and at least one lower nozzle 38 disposed adjacent to and below the outer lower edge 34 of flight deck doorway 20 and directed upwardly. System 12 further includes a conduit system 40 that is configured to deliver air from the flight deck air supply to the upper and lower nozzles 36 and 38, respectively, and an airflow controller 42 that is configured to provide sufficient air flow from the flight deck air supply to the upper and lower nozzles 36 and 38 to create downward directional airstream 44 and upper directional airstream 46, respectively, across gaps 24 and 30 existing between closed flight deck door 22 and the upper and lower edges 28 and 34 of flight deck doorway 20, thereby limiting infiltration of cabin air into flight deck 14.

The systems disclosed herein may include an air delivery system 48 that includes the one or more upper nozzles 36, one or more lower nozzles 38, and conduit system 40 that is configured to deliver air from flight deck 14 to nozzles 36 and 38. The conduit system 40 may include any suitable combination of air ducts and channels for delivering an adequate airflow from flight deck 14.

Any configuration of one or more air nozzles that substantially prevents air infiltration through the upper and lower gaps 24 and 30 is a suitable configuration of air nozzles. In one aspect of the disclosed systems, the one or more upper nozzles 36 and the one or more lower nozzles 38 are configured so that the directional airstreams 44 and 46 that they create extend across an entire width 50 of the flight deck doorway 20.

In one aspect of the disclosed system, each of upper and lower nozzles 36 and 38 is substantially slot-shaped. Upper nozzle 36 and lower nozzle 38 may be comprised of a single slot 51, or they may each independently be formed of multiple individual slots that, in combination, function as a single slot-shaped nozzle.

In another aspect of the disclosed system, the at least one upper nozzle 36 is disposed adjacent to and above upper gap 24 and is directed downwardly to create an air curtain 52 across upper gap 24, and at least one lower nozzle 38 disposed adjacent to and below lower gap 30 that is directed upwardly to create an air curtain 54 across lower gap 30.

A digital model was employed to evaluate the effectiveness of air curtains to substantially prevent infiltration of passenger cabin air. In the model, the flight deck door was assumed to have a width of approximately 21.75 inches (55.25 cm) and a height of approximately 80.3 inches (204.0 cm). The upper gap and lower gap above and below the flight deck door were assumed to be approximately 0.25 inches (6.35 mm) in height, and to extend the width of the flight deck door (21.75 inches, 55.25 cm). Air flow through gaps at the right and left sides of the flight deck door were assumed to be negligible and not included in the model.

The rate of air flow through the upper and lower gaps is proportional to the air pressure difference between the air in the flight deck and the air in the passenger cabin. During a typical flight, the difference between the passenger cabin air pressure and the flight deck air pressure is about 5 pascals. At that pressure differential, the model showed that the total rate of air flow through the 0.25 inch gaps above and below the flight deck door would be approximately 25 cubic feet per minute (0.71 m$^3$/min) in total.

An upper and lower air nozzle were then added to the model, where each nozzle was assumed to consist of a single slot, disposed immediately adjacent to the upper and lower edges of the flight deck doorway, respectively, on the outer bulkhead, and disposed along the entire width of the upper and lower gaps, and directed toward and across the adjacent gap. The slot width 55 for each nozzle was assumed to be 0.125 inches (3.18 mm) wide, and air velocities at each nozzle ranging from 5 mph (2.2 m/s) to 20 mph (8.9 m/s) were modelled.

For each gap, it was found that as the rate of air flow through the adjacent nozzle was increased, the amount of cabin air infiltrating the flight deck decreased. When the air flow through a nozzle was equal to that of the air flow from the passenger cabin through the adjacent gap, the flow of cabin air into the flight deck had decreased to approximately 5%. When the air through the nozzle was twice that of the air flow from the passenger cabin through the adjacent gap, the flow of cabin air into the flight deck had decreased to approximately zero. For the digital model, with a pressure differential of 5 pascals, this corresponds to a total air flow through the nozzles of 50 CFM (1.4 m$^3$/min).

The amount of air required to be directed through air delivery system 48 from flight deck 14 to upper and lower nozzles 36 and 38 is therefore easily attainable, both with respect to the mechanical capacity of an air handling system, and the energetic demand on the electrical capacity of an aircraft. The digital model reveals that, in general, when the total air flow through the upper and lower nozzles 36 and 38 of the disclosed system 12 is approximately twice the air flow through upper and lower gaps 24 and 30 of flight deck doorway 20, then infiltration of passenger cabin air into flight deck 14 is substantially prevented.

In an alternative aspect of the present disclosure, system 12 of aircraft 10 includes a cabin air pressure sensor 56, a flight deck air pressure sensor 58, and air delivery system 48 is configured to deliver air from flight deck 14 to create air curtain 52 across upper gap 24 between upper edge 28 of flight deck doorway 20 and flight deck door 22, and to create air curtain 54 across lower gap 30 between lower edge 34 of flight deck doorway 20 and flight deck door 22. System 12 further includes a processor 60 coupled to cabin air pressure sensor 56 and flight deck air pressure sensor 58 that is configured to control air delivery system 48, as this permits the air delivery system to be actively controlled.

Figure 4:
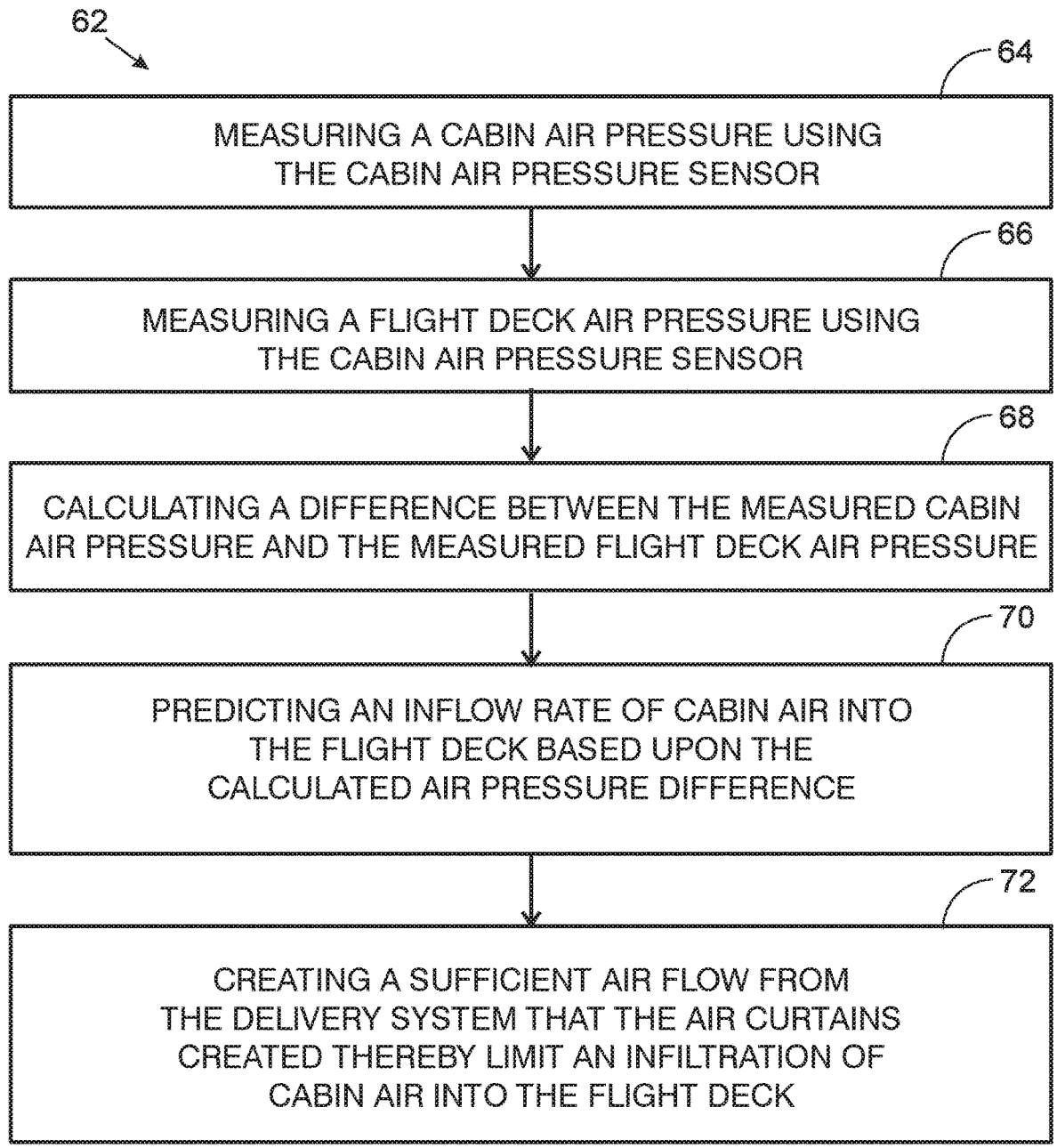
FIG. 4 is a flowchart showing representative operations for a processor to limit infiltration of cabin air into a flight deck, according to aspects of the present disclosure.

Processor 60 is configured to carry out the following operations using the appropriate components of system 12, as set out in the flowchart 62 of FIG. 4: Measure a cabin air pressure using cabin air pressure sensor 56 at step 64 of flowchart 62; measure a flight deck air pressure using flight deck air pressure sensor 58 at step 66 of flowchart 62; calculate a difference between measured cabin air pressure and measured flight deck air pressure at step 68 of flowchart 62; predict an inflow rate of cabin air into flight deck 14 based upon the calculated air pressure difference at step 70 of flowchart 62; and create a sufficient air flow from air delivery system 48 that air curtains 52 and 54 created thereby limit an infiltration of cabin air into flight deck 14, at step 72 of flowchart 62.

In one aspect of presently disclosed system 12, air pressure sensors 58 and 56 are configured to determine a flight deck air pressure measurement and a cabin air pressure measurement, respectively, for airflow controller 42, and airflow controller 42 is configured to determine a difference in the cabin air pressure and the flight deck air pressure, and from the determined difference to further determine a sufficient amount of air flow to supply from the flight deck air supply to the upper and lower nozzles 36 and 38 to thereby limit infiltration of cabin air into flight deck 14.

Airflow controller 42 may be configured to determine the sufficient amount of air flow to supply upper and lower nozzles 36 and 38 by comparing the determined difference in the cabin air pressure and flight deck air pressure, and then use the determined difference to obtain a corresponding rate of inflow from passenger cabin 16 to flight deck 14. In one aspect of the disclosure, airflow controller employs a look-up table in order to determine the rate of inflow that corresponds to the determined difference in cabin air pressure and flight deck air pressure, so that an air flow sufficient to block the cabin air infiltration may be calculated. The values in the look-up table relating the pressure differential to the infiltration rate may be determined either by prior modelling of the geometry of the aircraft, in particular including the sizes and shapes of upper gap 24 and lower gap 30, and the configuration of upper nozzle 36 and lower nozzle 38. Alternatively, the look-up table may be generated by physical experimentation on an aircraft having the same or similar configuration as the one in which system 12 is installed.

In either case, airflow controller 42 is configured to calculate an inflow rate around flight deck door 22 based upon the difference in air pressure between the passenger cabin 16 and flight deck 14, and airflow controller 42 is further configured to provide a sufficient rate of air flow to the upper and lower nozzles 36 and 38 that is at least twice as much as the calculated inflow rate, thereby effectively limiting the inflow of air from passenger cabin 16.

In a particular aspect of the disclosed system, airflow controller 42 is configured to measure the difference in cabin air pressure and flight deck air pressure, and vary the air flow to the upper and lower nozzles 36 and 38 in response to changes in the difference in cabin air pressure and flight deck air pressure in real time, providing flexibility and enhanced safety.

Typically, airflow controller 42 is configured to provide sufficient air flow to the upper and lower nozzles 36 and 38 to establish directional airstreams 44 and 46 that flow across the gaps 24 and 30 at the upper and lower edges 26 and 32 of the flight deck door 22 at a flow rate based on a sensed pressure differential between the flight deck 14 and cabin 16, to limit cabin air infiltration through the gaps 24 and 30 into flight deck 14 to less than 2% of the flight deck air supply.

Where air delivery system 48, under the control of airflow controller 42, varies the air flow to upper and lower nozzles 36 and 38, conduit system 40 further comprises a variable-speed fan 74 configured to deliver air from the flight deck air supply to upper and lower nozzles 36 and 38, and airflow controller 42 is configured to provide sufficient air flow to upper and lower nozzles 36 and 38 by controlling the fan speed of variable-speed fan 74. Air delivery system may additionally include an air filter 76 to additionally purify the air being delivered to upper and lower nozzles 36 and 38.

Where airflow controller 42 includes processor 60, where processor 60 is configured to predict the inflow rate of cabin air into flight deck 14 using a lookup table correlating the difference between cabin air pressure and flight deck air pressure with an inflow rate of cabin air via upper gap 24 and lower gap 30. In one aspect of system 12, air delivery system 48 includes variable-speed fan 74, and processor 60 is configured to control variable-speed fan 74 so that sufficient air is delivered to the at least one upper nozzle 36 and the at least one lower nozzle 38 to limit the infiltration of cabin air into flight deck 14.

In a particular aspect of system 12, processor 60 is further configured to create an air flow from air delivery system 48 that is at least twice the inflow rate of cabin air via upper gap 24 and lower gap 30, to ensure that infiltration of cabin air into flight deck 14 is limited and/or prevented.

In another aspect of system 12, processor 60 is configured to create a sufficient air flow from air delivery system 48 that the resulting air curtains 52 and 54 limit the infiltration of cabin air into flight deck 14 to less than 2% of the flight deck air supply, to ensure that infiltration of cabin air into flight deck 14 is limited and/or prevented.

System 12 may further include a flight deck particulate sensor 78 coupled to processor 60, where processor 60 is configured so that if flight deck particulate sensor 78 detects increased particulates in the flight deck air supply, air flow from air delivery system 48 to the air curtains 52 and 54 is increased, thereby permitting system 12 to respond automatically to any contamination from potential infiltration of passenger cabin air.

Figure 5:
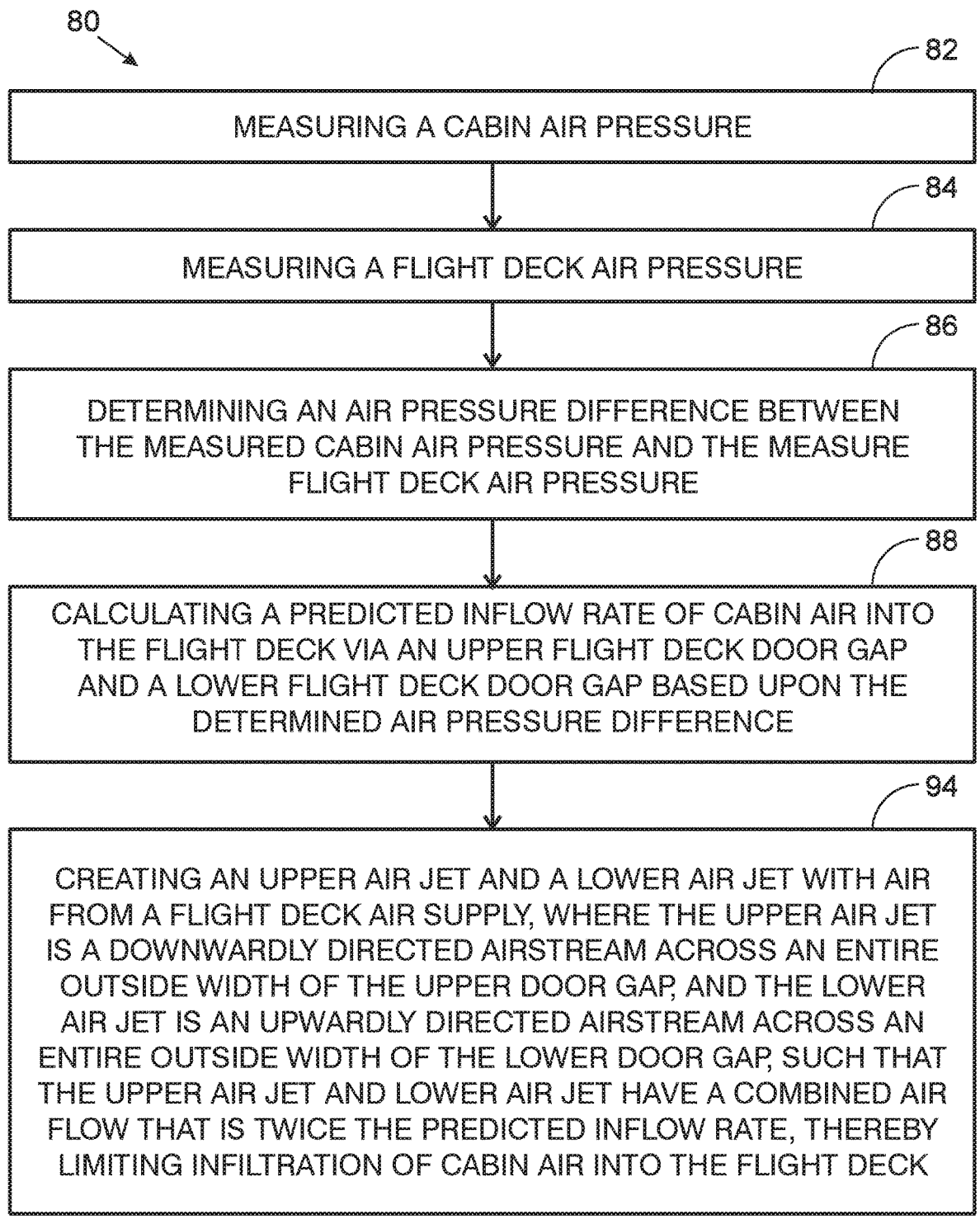
FIG. 5 is a flowchart for a representative method of limiting infiltration of cabin air into a flight deck according to an aspect of the present disclosure.

The systems of the present disclosure are well-suited to carry out a method of limiting infiltration of cabin air into flight deck 14 of aircraft 10, as set out in flowchart 80 of FIG. 5. The method includes measuring cabin air pressure at step 82 of flowchart 80; measuring flight deck air pressure at step 84 of flowchart 80; determining an air pressure difference between measured cabin air pressure and measured flight deck air pressure at step 86 of flowchart 80; calculating a predicted inflow rate of cabin air into flight deck 14 via upper flight deck door gap 24 and lower flight deck door gap 30 based upon the determined air pressure difference at step 88 of flowchart 80; and creating an upper air jet 90 and a lower air jet 92 with air from a flight deck air supply, at step 94 of flowchart 80, where upper air jet 90 is a downwardly directed airstream across an entire outside width 50 of upper door gap 24, and lower air jet 92 is an upwardly directed airstream across an entire outside width 50 of lower door gap 30, such that upper air jet 90 and lower air jet 92 have a combined air flow that is twice the predicted inflow rate, limiting infiltration of cabin air into flight deck 14.

In an alternate aspect of the disclosure, the system 12 includes an upper gap 24 between the upper edge 26 of a flight deck door 22 and the upper edge 28 of a doorway 20, and a lower gap 30 between the lower edge 32 of the flight deck door 22 and lower edge 34 of a doorway 20, and an air delivery system 48 configured to establish air flow to create an air curtain across the upper gap 24 and lower gap 30. The air curtain across the lower gap is generated by a lower orifice through which air is drawn to create an air stream flowing across the lower gap and into the lower orifice, while the air curtain across the upper gap is generated via an upper nozzle 36 delivering an air stream that blows across the upper gap. By creating an air stream across gaps along the closed flight deck door, infiltration of air from the passenger cabin may be suppressed or eliminated. The upper nozzle 36 is disposed adjacent to and above the outer upper edge 28 of flight deck doorway 20 and directed downwardly. The lower orifice 38 is disposed adjacent to and below the outer lower edge 34 of flight deck doorway 20, where air is drawn through the lower orifice 38 to create an air stream flowing across the lower gap. System 12 includes a fan in communication with a conduit system 40 configured to provide return air that is drawn through the lower orifice 38 (through which air is drawn to create an air stream flowing across the lower gap), and configured to deliver an air supply to the upper nozzle 36 to create an air stream across the upper gap. The system includes an air delivery system 48 that includes the fan and conduit system 40, which provides sufficient air flow to the upper nozzle 36 and sufficient return air flow drawn through the lower orifice 38 to create a downward directional airstream 44 across the upper gap 24 and a downward directional airstream 46 across the lower gap 30, to thereby limit infiltration of cabin air into flight deck 14. The upper nozzle 36 and lower orifice 38 are each substantially slot-shaped. The upper nozzle 36 and lower orifice 38 may be comprised of a single slot, or they may each independently be formed of multiple individual slots that, in combination, function as a single slot-shaped nozzle.

The system 12 further includes an airflow controller 42 and air pressure sensors 58 and 56 that are configured to determine a flight deck air pressure measurement and a cabin air pressure measurement, respectively, for airflow controller 42. The airflow controller 42 is configured to determine a difference in the cabin air pressure and the flight deck air pressure, and based on the determined difference establish a sufficient amount of air flow from the flight deck air supply to the upper nozzle 36 and a sufficient amount of return air draw through the lower orifice 38 to create air curtains to limit infiltration of cabin air into flight deck 14. Airflow controller 42 may be configured to determine the sufficient amount of air flow by comparing the determined difference in the cabin air pressure and flight deck air pressure, and then use the determined difference to obtain a corresponding rate of inflow from passenger cabin 16 to flight deck 14. Airflow controller 42 is configured to provide sufficient air flow through the lower orifice and sufficient air flow to the upper nozzle 36 to establish directional airstreams 44 and 46 that flow across the gaps at the upper and lower edges of the flight deck door 22 at a flow rate based on a sensed pressure differential between the flight deck 14 and cabin 16, to limit cabin air infiltration through the gaps 24 and 30 to less than 2% of the flight deck air supply. A processor of the airflow controller 42 may be configured to determine a speed for operating fan 72 of the air delivery system to create an air flow that is at least twice the inflow rate of cabin air via upper and lower gaps, to ensure that infiltration of cabin air into flight deck 14 is limited and/or prevented.

Accordingly, the system 12 and air delivery system 48 may utilize recirculated air from the flight deck to establish directional airstreams 44 and 46 and create the air curtains across the upper gap 24 and lower gap 30 at the upper and lower edges of the flight deck door 22 to limit cabin air infiltration through the gaps 24 and 30 into the flight deck 14. Alternatively, the air delivery system 48 may draw a supply of air from fresh bleed air for the flight deck, for creating the air curtains across the upper gap 24 and lower gap 30 at the upper and lower edges of the flight deck door 22. Additionally, the aircraft may further include a passenger cabin particulate sensor 79 disposed within the cabin on the opposite side of the flight deck door, which is configured for sensing smoke or particle detection and communicating smoke/particle detection to the system 12. The processor and/or airflow controller are configured to receive a communication from the particular sensor indicating a detection of smoke or specific airborne particulate, where the airflow controller 42 is configured to change the speed of the fan to a determined increased airflow rate to create turbo-charged air curtains to limit cabin air infiltration through the gaps 24 and 30 and into the flight deck.

In another aspect of the present disclosure, system 12 of aircraft 10 includes a cabin air pressure sensor 56, a flight deck air pressure sensor 58, and an air delivery system 48 configured to deliver air from the flight deck 14 to create an air curtain 52 across a left side gap between a left edge of the flight deck doorway 20 and flight deck door 22, and to create an air curtain 54 across a ride side gap between a right edge of the flight deck doorway 20 and flight deck door 22. The system 12 includes air pressure sensors 58 and 56 that are configured to determine a flight deck air pressure measurement and a cabin air pressure measurement, respectively, for airflow controller 42, and airflow controller 42 is configured to determine a difference in the cabin air pressure and the flight deck air pressure, and to determine from the difference a sufficient amount of air flow to supply from the flight deck air supply to the left and right side nozzles to thereby limit infiltration of cabin air into flight deck 14. Airflow controller 42 may be configured to determine the sufficient amount of air flow to supply the left and right side nozzles by comparing the determined difference in the cabin air pressure and flight deck air pressure, and then using the determined difference to obtain a corresponding rate of inflow from passenger cabin 16 to flight deck 14. Airflow controller 42 is configured to provide sufficient air flow to the left and right side nozzles to establish directional airstreams 44 and 46 that flow across the gaps at the left and right edges of the flight deck door 22 at a flow rate based on a sensed pressure differential between the flight deck 14 and cabin 16, to limit cabin air infiltration through the gaps 24 and 30 into flight deck 14 to less than 2% of the flight deck air supply. A processor of the airflow controller 42 may be configured to determine a speed for operating a fan 72 of the air delivery system to create an air flow that is at least twice the inflow rate of cabin air via left and right side gaps, to ensure that infiltration of cabin air into flight deck 14 is limited and/or prevented. Additionally, the air may be configured to establish directional airstreams that flow across the gaps in areas at the door latches and hinges.

In one aspect of the present disclosure, calculating the predicted inflow rate of cabin air into flight deck, as set out in the method of flowchart 80, includes consulting an inflow lookup table that correlates the determined air pressure difference with predicted inflow rates. The inflow lookup table may be prepared by calculating rates of inflow based upon a size and configuration of upper door gap 24 and lower door gap 30. Alternatively, or in addition, the inflow lookup table is prepared by experimentally determining rates of inflow as a function of air pressure difference between the measured cabin air pressure and the measured flight deck air pressure.

Preferably, the method of flowchart 80 includes creating upper air jet 90 and lower air jet 92 from the flight deck air supply and limiting cabin air infiltration to less than 2% of the flight deck air supply.

Aspects of the presently disclosed systems and methods may include, or be embodied as, a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects, all of which may generally be referred to herein as a "module," or "system." Furthermore, aspects of the present disclosure may take the form of a computer program product embodied in a computer-readable medium (or media) having computer readable program code/instructions embodied thereon.

The calculations used to operate disclosed airflow controller 42 to limit infiltration of cabin air into flight deck 14 of aircraft 10 may be carried out on any suitable data processing system, which may include a communications framework to provide communications between one or more processor units, memory, persistent storage, communications units, input/output (I/O) units, and displays.

Instructions for an operating system, applications, and/or programs may be located in one or more storage devices in communication with the one or more processor units through the communications framework. The instructions may be in a functional form on a persistent storage. These instructions may be loaded into a memory for execution by a processor unit.

These instructions may be referred to as program instructions, program code, computer usable program code, or computer readable program code that may be read and executed by a processor. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present disclosure may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

The computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Various aspects and examples of systems and methods of limiting infiltration of cabin air into a flight deck of an aircraft are described below and illustrated in the associated drawings. Unless otherwise specified, the disclosed systems and/or their various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

EXAMPLES, COMPONENTS, AND ALTERNATIVES

The following numbered paragraphs describe selected aspects of systems and methods of limiting infiltration of passenger cabin air into the flight deck of an aircraft. The examples in these sections are intended for illustration and should not be interpreted as limiting the entire scope of the present disclosure. Each section may include one or more distinct embodiments or examples, and/or contextual or related information, function, and/or structure.

A1. A system for limiting infiltration of cabin air into a flight deck of an aircraft, comprising: at least one upper nozzle disposed adjacent to and above an outer upper edge of a flight deck doorway and directed downwardly, and at least one lower nozzle disposed adjacent to and below an outer lower edge of the flight deck doorway and directed upwardly; a conduit system configured to deliver air from a flight deck air supply to the upper and lower nozzles; and an airflow controller configured to provide sufficient air flow from the flight deck air supply to the upper and lower nozzles to create directional airstreams across gaps existing between a closed flight deck door and the upper and lower edges of the flight deck doorway, limiting infiltration of cabin air into the flight deck.

A2. The system of paragraph A1, wherein the one or more upper nozzles and the one or more lower nozzles are configured so that the directional airstreams they create extend across an entire width of the flight deck doorway A3. The system of paragraph A1, wherein each of the upper and lower nozzles is substantially slot-shaped.

A4. The system of paragraph A1, further comprising air pressure sensors configured to determine a flight deck air pressure measurement and a cabin air pressure measurement for the airflow controller; and the airflow controller is configured to determine a difference in the cabin air pressure and the flight deck air pressure, and from the determined difference to further determine a sufficient amount of air flow to supply from the flight deck air supply to the upper and lower nozzles to limit infiltration of cabin air into the flight deck.

A5. The system of paragraph A4, wherein the airflow controller is configured to calculate an inflow rate around the flight deck door based upon the difference in air pressure between the cabin and the flight deck; and the airflow controller is further configured to provide a sufficient rate of air flow to the upper and lower nozzles that is at least twice as much as the calculated inflow rate.

A6. The system of paragraph A4, wherein the airflow controller is configured to measure the difference in cabin air pressure and flight deck air pressure, and vary the air flow to the upper and lower nozzles in response to changes in the difference in cabin air pressure and flight deck air pressure in real time.

A7. The system of paragraph A1, wherein the airflow controller is configured to provide sufficient air flow to the upper and lower nozzles to establish directional airstreams that flow across the gaps at the upper and lower edges of the flight deck door at a flow rate based on a sensed pressure differential between the flight deck and cabin, to limit cabin air infiltration through the gaps into the flight deck to less than 2% of the flight deck air supply.

A8. The system of claim 1, wherein the conduit system further comprises a variable-speed fan configured to deliver air from the flight deck air supply to the upper and lower nozzles; and the airflow controller is configured to provide the sufficient air flow to the upper and lower nozzles by controlling fan speed.

B1. An aircraft system for limiting infiltration of cabin air into a flight deck, comprising: a cabin air pressure sensor; a flight deck air pressure sensor; an air delivery system, configured to deliver air from the flight deck to create air curtains across an upper gap between an upper edge of a flight deck doorway and a flight deck door, and across a lower gap between a lower edge of the flight deck doorway and the flight deck door; a processor coupled to the cabin air pressure sensor and the flight deck air pressure sensor, and configured to control the air delivery system; wherein the processor is configured to: measure a cabin air pressure using the cabin air pressure sensor; measure a flight deck air pressure using the flight deck air pressure sensor; calculate a difference between the measured cabin air pressure and the measured flight deck air pressure; predict an inflow rate of cabin air into the flight deck based upon the calculated air pressure difference; and create a sufficient air flow from the air delivery system that the air curtains created thereby limit an infiltration of cabin air into the flight deck.

B2. The aircraft system of paragraph B1, wherein the processor predicts the inflow rate of cabin air into the flight deck using a lookup table correlating the difference between cabin air pressure and flight deck air pressure with an inflow rate of cabin air via the upper gap and the lower gap.

B3. The aircraft system of paragraph B2, wherein the processor is further configured to create an air flow from the air delivery system that is at least twice the inflow rate of cabin air via the upper gap and lower gap.

B4. The aircraft system of paragraph B1, wherein the air delivery system comprises at least one upper nozzle disposed adjacent to and above the upper gap that is directed downwardly to create the air curtain across the upper gap, and at least one lower nozzle disposed adjacent to and below the lower gap that is directed upwardly to create the air curtain across the lower gap.

B5. The aircraft system of paragraph B4, wherein the air delivery system includes a variable-speed fan, and the processor is configured to control the variable-speed fan so that sufficient air is delivered to the at least one upper nozzle and the at least one lower nozzle to limit the infiltration of cabin air into the flight deck.

B6. The aircraft system of paragraph B1, wherein the processor is configured to create a sufficient air flow from the air delivery system that the resulting air curtains limit the infiltration of cabin air into the flight deck to less than 2% of the flight deck air supply.

B7. The aircraft system of paragraph B1, further comprising a flight deck particulate sensor coupled to the processor, wherein the processor is configured so that if the flight deck particulate sensor detects increased particulates in a flight deck air supply, the air flow from the air delivery system to the air curtains is increased.

B8. The aircraft system of paragraph B1, wherein the processor is configured to receive a communication from a particulate sensor located within the passenger cabin that indicates a detection of smoke or specific airborne particles, and the processor is configured to responsively determine a speed for operating a fan of the air delivery system so as to establish an increased airflow rate to create higher speed air curtains to inhibit cabin air infiltration through the upper and lower gaps and into the flight deck area.

C1. A method of limiting infiltration of cabin air into a flight deck of an aircraft, comprising: measuring a cabin air pressure; measuring a flight deck air pressure; determining an air pressure difference between the measured cabin air pressure and the measured flight deck air pressure; calculating a predicted inflow rate of cabin air into the flight deck via an upper flight deck door gap and a lower flight deck door gap based upon the determined air pressure difference; wherein the upper flight deck door gap is defined by an upper edge of a flight deck doorway and an upper edge of a flight deck door, and the lower flight deck door gap is defined by a lower edge of the flight deck doorway and a lower edge of the flight deck door; creating an upper air jet and a lower air jet with air from a flight deck air supply, where the upper air jet is a downwardly directed airstream across an entire outside width of the upper door gap, and the lower air jet is an upwardly directed airstream across an entire outside width of the lower door gap, such that the upper air jet and lower air jet have a combined air flow that is twice the predicted inflow rate, thereby limiting infiltration of cabin air into the flight deck.

C2. The method of paragraph C1, wherein calculating the predicted inflow rate of cabin air into the flight deck includes consulting an inflow lookup table that correlates the determined air pressure difference with predicted inflow rates.

C3. The method of paragraph C2, further comprising preparing the inflow lookup table by calculating rates of inflow based upon a size and configuration of the upper door gap and the lower door gap.

C4. The method of paragraph C2, further comprising preparing the inflow lookup table by experimentally determining rates of inflow as a function of air pressure difference between the measured cabin air pressure and the measured flight deck air pressure.

C5. The method of paragraph C1, wherein creating the upper air and the lower air jet from the flight deck air supply limits cabin air infiltration to less than 2% of the flight deck air supply.

ADVANTAGES, FEATURES, BENEFITS

The different embodiments and examples of the systems and methods described herein provide several advantages over previous strategies for preventing infiltration of cabin air into an aircraft flight deck, which have typically relied upon controlling specific pathways for air leakage between compartments, and/or manipulation of ventilation airflow rates. As the flight deck area is required to have many openings and pass-throughs for ducting, wiring, and flight controls, and so it may be impractical and costly to attempt to seal every possible leak point between compartments. In addition, it can become impractical to simply rely on a positive pressure differential, as the positive pressure required may be difficult to attain without creating large and disruptive air movement with the flight deck. Additionally, the aircraft may provide specific practical or spatial limitations on the installation of exhaust devices.

The implementation of the systems and methods of the present disclosure could ameliorate or eliminate the need to seal alternative other leakage paths within the structure of the aircraft, thereby simplifying manufacturing. Additionally, or in the alternative, the present systems could help circulate or recirculate air within the aircraft, and help create more flexibility in the location and function of aircraft exhaust devices, such as pressurization outflow valves In addition, during use the air nozzles of the disclosed systems may additionally create local pockets of slight negative pressure near the nozzles, which may partially or fully negate the normally slightly positive pressure differential between the passenger cabin and the flight deck.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A system for limiting infiltration of cabin air from a passenger cabin into a flight deck of an aircraft, comprising:
at least one upper nozzle disposed adjacent to and above an outer upper edge of a flight deck doorway and directed downwardly, and at least one lower nozzle disposed adjacent to and below an outer lower edge of the flight deck doorway and directed upwardly, wherein the flight deck doorway has an inner side facing the flight deck and an outer side facing the passenger cabin, and wherein the at least one upper nozzle and the at least one lower nozzle are adjacent the outer side of the flight deck doorway;

a conduit system configured to deliver air from a flight deck air supply to the upper and lower nozzles; and an airflow controller configured to provide sufficient air flow from the flight deck air supply to the upper and lower nozzles to create directional airstreams across gaps existing between a closed flight deck door and the upper and lower edges of the flight deck doorway, limiting infiltration of cabin air into the flight deck.

2. The system of claim 1, wherein the at least one upper nozzle and the at least one lower nozzle are configured so that the directional airstreams they create extend across an entire width of the flight deck doorway.

3. The system of claim 1, wherein each of the upper and lower nozzles is substantially slot-shaped.

4. The system of claim 3, wherein the gaps include an upper gap and a lower gap, wherein the at least one upper nozzle is comprised of a single slot disposed along an entire width of the upper gap, and wherein the at least one lower nozzle is comprised of a single slot disposed along an entire width of the lower gap.

5. The system of claim 1, further comprising air pressure sensors configured to determine a flight deck air pressure measurement and a cabin air pressure measurement for the airflow controller; and the airflow controller is configured to determine a difference in the cabin air pressure and the flight deck air pressure, and from the determined difference to further determine a sufficient amount of air flow to supply from the flight deck air supply to the upper and lower nozzles to limit infiltration of cabin air into the flight deck.

6. The system of claim 5, wherein the airflow controller is configured to calculate an inflow rate around the flight deck door based upon the difference in air pressure between the cabin and the flight deck; and the airflow controller is further configured to operate system components to provide a sufficient rate of air flow to the upper and lower nozzles that is at least twice as much as the calculated inflow rate.

7. The system of claim 5, wherein the airflow controller is configured to measure the difference in cabin air pressure and flight deck air pressure, and vary the air flow to the upper and lower nozzles in response to changes in the difference in cabin air pressure and flight deck air pressure in real time.

8. The system of claim 1, wherein the airflow controller is configured to provide sufficient air flow to the upper and lower nozzles to establish directional airstreams that flow across the gaps at the upper and lower edges of the flight deck door at a flow rate based on a sensed pressure differential between the flight deck and cabin, to limit cabin air infiltration through the gaps into the flight deck to less than 2% of the flight deck air supply.

9. The system of claim 1, wherein the conduit system further comprises a variable-speed fan configured to deliver air from the flight deck air supply to the upper and lower nozzles; and the airflow controller is configured to provide the sufficient air flow to the upper and lower nozzles by controlling fan speed.

10. The system of claim 1, further comprising:
a cabin air pressure sensor;
a flight deck air pressure sensor; and
an air delivery system including the at least one upper nozzle, the at least one lower nozzle, and the conduit system, the air delivery system being configured to deliver air from the flight deck air supply to create air curtains across an upper gap between the outer upper edge of the flight deck doorway and the flight deck door, and across a lower gap between the outer lower edge of the flight deck doorway and the flight deck door; and wherein the airflow controller includes a processor coupled to the cabin air pressure sensor and the flight deck air pressure sensor, and configured to control the air delivery system; wherein the processor is configured to:
measure a cabin air pressure using the cabin air pressure sensor;
measure a flight deck air pressure using the flight deck air pressure sensor;
calculate a difference between the measured cabin air pressure and the measured flight deck air pressure;
predict an inflow rate of cabin air into the flight deck based upon the calculated air pressure difference; and
create a sufficient air flow from the air delivery system that the air curtains created thereby limit an infiltration of cabin air into the flight deck.

11. The aircraft system of claim 10, wherein the processor predicts the inflow rate of cabin air into the flight deck using a lookup table correlating the difference between cabin air pressure and flight deck air pressure with an inflow rate of cabin air via the upper gap and the lower gap.

12. The aircraft system of claim 11, wherein the processor is further configured to create an air flow from the air delivery system that is at least twice the inflow rate of cabin air via the upper gap and lower gap.

13. The aircraft system of claim 10, wherein the at least one upper nozzle is disposed adjacent to and above the upper gap and is directed downwardly to create the air curtain across the upper gap, and wherein at least one lower nozzle is disposed adjacent to and below the lower gap and is directed upwardly to create the air curtain across the lower gap.

14. The aircraft system of claim 13, wherein the air delivery system includes a variable-speed fan, and the processor is configured to control the variable-speed fan so that sufficient air is delivered to the at least one upper nozzle and the at least one lower nozzle to limit the infiltration of cabin air into the flight deck.

15. The aircraft system of claim 10, wherein the processor is configured to create a sufficient air flow from the air delivery system that the resulting air curtains limit the infiltration of cabin air into the flight deck to less than 2% of the flight deck air supply.

16. The aircraft system of claim 10, further comprising a flight deck particulate sensor coupled to the processor, wherein the processor is configured so that if the flight deck particulate sensor detects increased particulates in the flight deck air supply, the air flow from the air delivery system to the air curtains is increased.

17. The aircraft system of claim 10, wherein the processor is configured to receive a communication from a particulate sensor located within the passenger cabin that indicates a detection of smoke or specific airborne particles, and the processor is configured to responsively determine a speed for operating a fan of the air delivery system so as to establish an increased airflow rate to create higher speed air curtains to inhibit cabin air infiltration through the upper and lower gaps and into the flight deck.

18. A method of limiting infiltration of cabin air into the flight deck of the aircraft of claim 1, the method comprising:
measuring a cabin air pressure;
measuring a flight deck air pressure;

determining, using the airflow controller, an air pressure difference between the measured cabin air pressure and the measured flight deck air pressure;

calculating, using the airflow controller, a predicted inflow rate of cabin air into the flight deck via an upper flight deck door gap and a lower flight deck door gap based upon the determined air pressure difference;

wherein the upper flight deck door gap is defined by the outer upper edge of the flight deck doorway and an upper edge of the flight deck door, and the lower flight deck door gap is defined by the outer lower edge of the flight deck doorway and a lower edge of the flight deck door; and creating an upper air jet using the conduit system and the at least one upper nozzle and a lower air jet using the conduit system and the at least one lower nozzle with air from the flight deck air supply, where the upper air jet is a downwardly directed airstream across an entire outside width of the upper flight deck door gap, and the lower air jet is an upwardly directed airstream across an entire outside width of the lower flight deck door gap, such that the upper air jet and lower air jet have a combined air flow that is twice the predicted inflow rate, thereby limiting infiltration of cabin air into the flight deck.

19. The method of claim 18, wherein creating the upper air jet and the lower air jet from the flight deck air supply limits cabin air infiltration to less than 2% of the flight deck air supply.

20. The method of claim 18, wherein calculating the predicted inflow rate of cabin air into the flight deck includes consulting an inflow lookup table that correlates the determined air pressure difference with predicted inflow rates.

21. The method of claim 20, further comprising preparing the inflow lookup table by calculating rates of inflow based upon a size and configuration of the upper flight deck door gap and the lower flight deck door gap.

22. The method of claim 20, further comprising preparing the inflow lookup table by experimentally determining rates of inflow as a function of air pressure difference between the measured cabin air pressure and the measured flight deck air pressure.

23. The system of claim 1, wherein the gaps include an upper gap and a lower gap, and wherein airflow from the at least one upper nozzle creates an air curtain across the upper gap and airflow from the at least one lower nozzle creates an air curtain across the lower gap.

24. The system of claim 1, wherein the directional air streams blow vertically across the gaps between the closed flight deck door and the outer upper edge and the outer lower edge of the flight deck doorway, to suppress infiltration of air from the passenger cabin of the aircraft.

* * * * *